(12) United States Patent
Cotton et al.

(10) Patent No.: US 9,381,873 B2
(45) Date of Patent: Jul. 5, 2016

(54) SPEAKER ASSEMBLY FOR MOTORCYCLE

(71) Applicants: George Calvin Cotton, Rancho Cucamonga, CA (US); Nicole Denise Cotton, Rancho Cucamonga, CA (US)

(72) Inventors: George Calvin Cotton, Rancho Cucamonga, CA (US); Nicole Denise Cotton, Rancho Cucamonga, CA (US)

( * ) Notice: Subject to any disclaimer, the term of this patent is extended or adjusted under 35 U.S.C. 154(b) by 0 days.

(21) Appl. No.: 14/330,653

(22) Filed: Jul. 14, 2014

(65) Prior Publication Data

US 2016/0009228 A1 Jan. 14, 2016

(51) Int. Cl.
*H04B 1/00* (2006.01)
*B60R 11/02* (2006.01)
*B62J 1/28* (2006.01)
*B62J 1/12* (2006.01)
*H04R 5/02* (2006.01)
*B62J 99/00* (2009.01)

(52) U.S. Cl.
CPC ............... *B60R 11/0217* (2013.01); *B62J 1/12* (2013.01); *B62J 1/28* (2013.01); *H04R 5/023* (2013.01); *B62J 2099/0006* (2013.01); *H04R 2499/13* (2013.01)

(58) Field of Classification Search
None
See application file for complete search history.

(56) References Cited

U.S. PATENT DOCUMENTS

| | | | |
|---|---|---|---|
| 3,853,351 A | 12/1974 | Lassiter | |
| 4,042,791 A | 8/1977 | Wiseman | |
| 4,490,842 A | 12/1984 | Watanabe | |
| 4,797,934 A * | 1/1989 | Hufnagel | A47C 7/383 181/145 |
| 7,159,938 B1 * | 1/2007 | Shiraishi | B60N 2/70 297/217.4 |

* cited by examiner

*Primary Examiner* — Regina N Holder
(74) *Attorney, Agent, or Firm* — Plager Schack LLP

(57) ABSTRACT

A speaker assembly for a motorcycle is configured to provide sound to a passenger in the motorcycle. The speaker assembly includes a first support attachment and a second support attachment, mechanically coupled to the motorcycle. A central support assembly is mechanically coupled to the first support attachment and the second support attachment. A first speaker and a second speaker are mechanically coupled to the central support assembly and electrically coupled to the motorcycle. Padding covers the central support assembly and fitting around the first speaker and the second speaker. The first speaker and the second speaker are configured to render the sound to the passenger sitting proximate the padding.

6 Claims, 3 Drawing Sheets

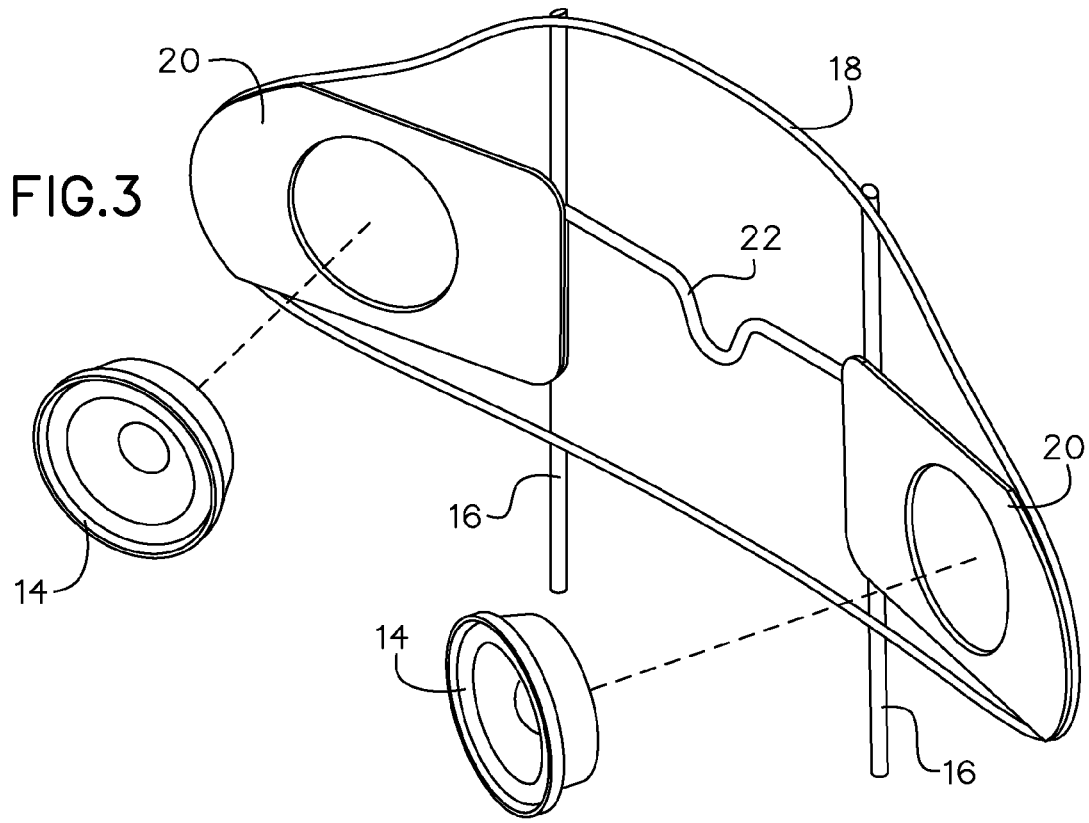
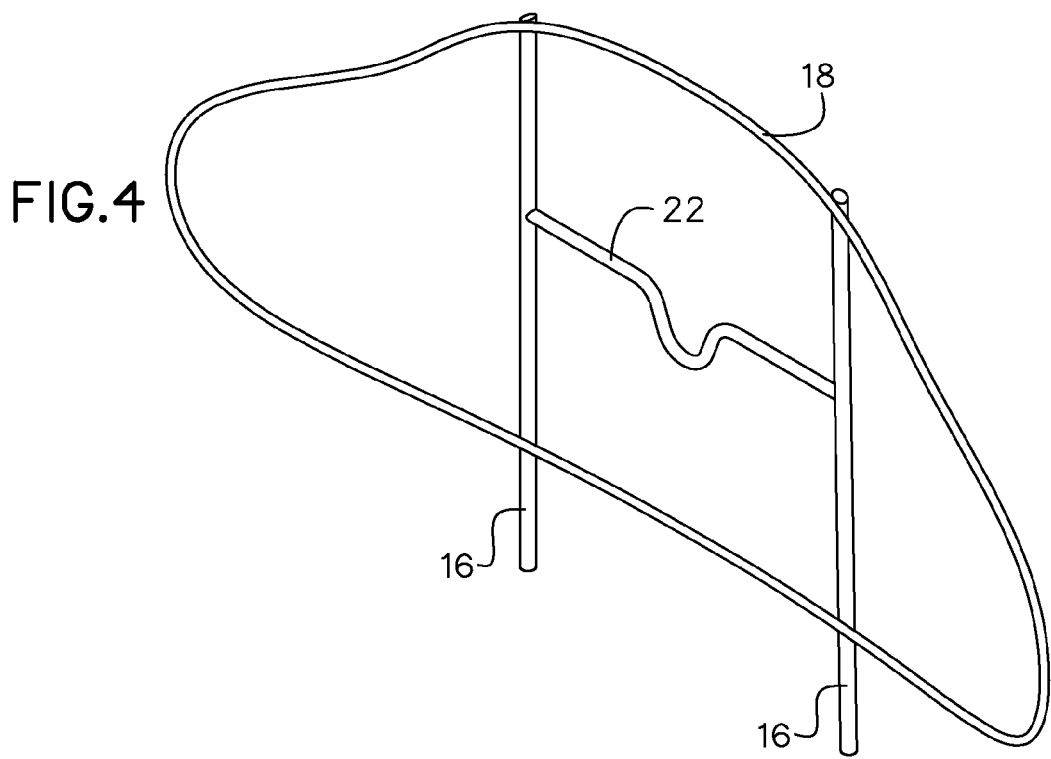

SPEAKER ASSEMBLY FOR MOTORCYCLE

BACKGROUND

The embodiments herein relate generally to accessories for motorcycles.

Prior to embodiments of the disclosed invention, when talking long distance trips with a passenger on the bike of a motorcycle, the passenger would experience wind turbulence and often get neck discomfort. The passenger may want to go to sleep but their head will bob back and forth because there is no neck and head support. Further, there was no good way to install speakers onto a motorcycle. The prior art includes: U.S. Pat. No. 4,490,842 issued to Watanabe; U.S. Pat. No. 3,853,351 issued to Lassiter; and U.S. Pat. No. 4,042,791 issued to Wiseman.

Watanabe teaches a two speakers attached to a headrest without a central support structure that lacks the strength of the present invention. Lassister teaches a headrest but has no theory of how to accommodate speakers. Wiseman teaches speakers attached to a headrest, but not integrated into the headrest; this lacks the ability to withstand a strong wind force.

SUMMARY

A speaker assembly for a motorcycle is configured to provide sound to a passenger in the motorcycle. The speaker assembly includes a first support attachment and a second support attachment, mechanically coupled to the motorcycle. A central support assembly is mechanically coupled to the first support attachment and the second support attachment. A first speaker and a second speaker are mechanically coupled to the central support assembly and electrically coupled to the motorcycle. Padding covers the central support assembly and fitting around the first speaker and the second speaker. The first speaker and the second speaker are configured to render the sound to the passenger sitting proximate the padding.

In some embodiments, the central support assembly can include a support frame that can be mechanically coupled to the first support attachment and the second support attachment. A first speaker plate and a second speaker plate can be mechanically coupled to the support frame. A central support can be mechanically coupled to the first support attachment and the second support attachment.

In some embodiments, the support frame can be generally hemispherical, with an upper left hand truncation and an upper right hand truncation to encourage aerodynamic efficiency. The support frame can be bent in a slightly concave manner so that the first speaker, the second speaker, and thus the sound, are directed inward toward the central support. The central support can be bent to accommodate a natural curvature of a base of a human neck.

A speaker wire can be electrically coupled to the first speaker and the second speaker, and configured to terminate at a speaker connector. A motorcycle wire can be electrically coupled to the motorcycle, and configured to terminate at a motorcycle connector. Connecting the speaker connector with the motorcycle connector enables a sound system of the motorcycle to connect with the first speaker and the second speaker.

BRIEF DESCRIPTION OF THE FIGURES

The detailed description of some embodiments of the invention is made below with reference to the accompanying figures, wherein like numerals represent corresponding parts of the figures.

FIG. 3 is an exploded view of an embodiment of the invention.

FIG. 4 is a perspective view of an alternate embodiment.

DETAILED DESCRIPTION OF CERTAIN EMBODIMENTS

Figure 1:
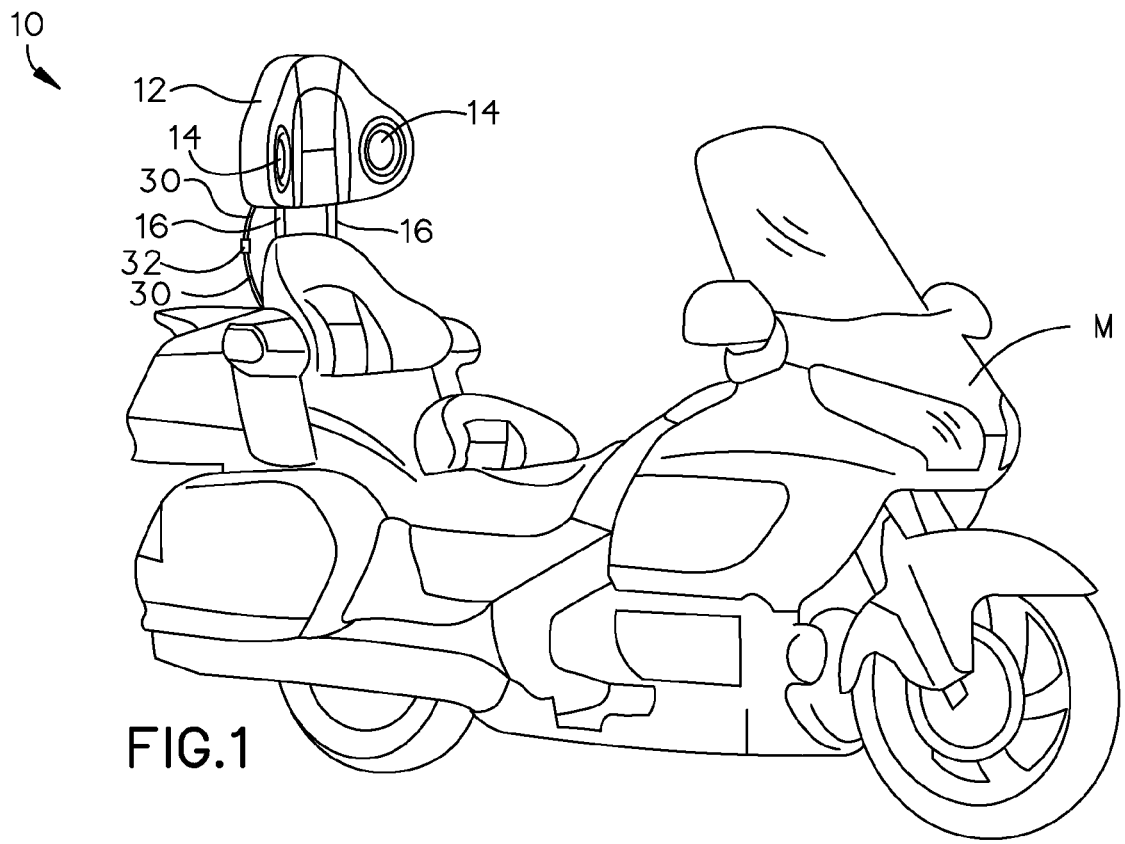
FIG. 1 is a perspective view of an embodiment of the invention shown in use.

By way of example, and referring to FIG. 1, motorcycle M is mechanically coupled to speaker assembly 10 with a plurality of support attachment 16. Speaker assembly 10 comprises a central support assembly mechanically coupled to padding 12 and speakers 14.

Figure 2:
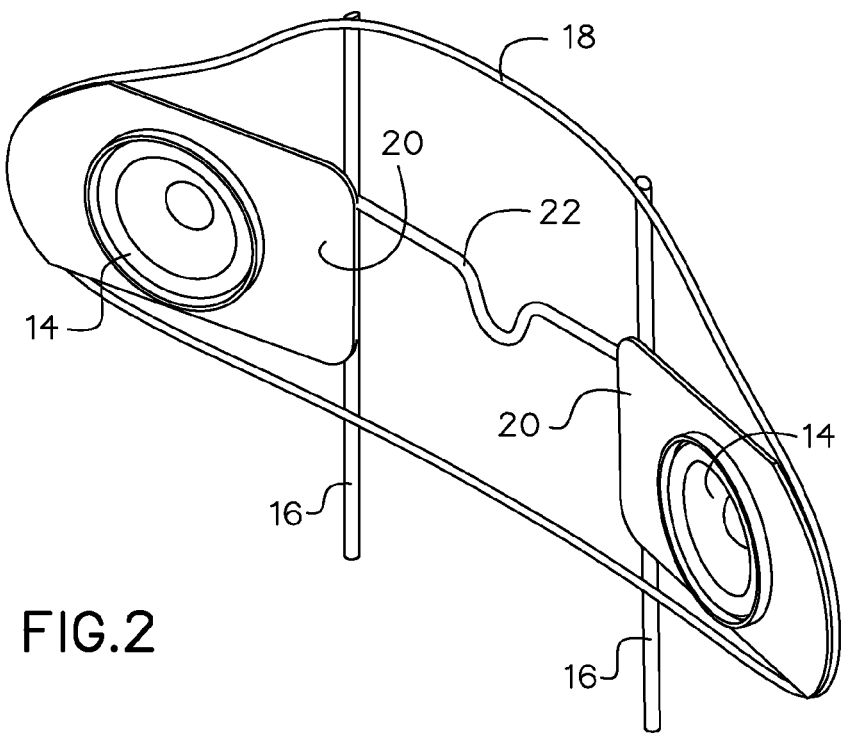
FIG. 2 is a perspective view of an embodiment of the invention.

FIG. 2, FIG. 3 and FIG. 4 show the central support assembly in more detail. The central support assembly comprises first support attachment 16 and second support attachment 16 mechanically coupled to support frame 18. Support frame 18 is mechanically coupled to first speaker plate 20 and second speaker plate 20. First support attachment 16 and second support attachment 16 are both mechanically coupled to central support 22.

The arrangement of the central support assembly reflects a melding of three design considerations: comfort for the passenger, support for speakers 14 and aerodynamic efficiency. Support frame 18 is generally hemispherical, with an upper left hand truncation and an upper right hand truncation to encourage aerodynamic efficiency. Support frame 18 is bent in a slightly concave manner so that speakers 14, and thus their sound, are directed inward toward central support 22.

A user would typically rest one's head in the middle of central support 16. However, lying into central support 22 could be uncomfortable. Embodiments of the present invention utilize central support 22 that is bent to accommodate the natural curvature of the base of a human neck.

First speaker plate 20 and second speaker plate 20 have demonstrated an excellent ability to avoid vibration in transit of motorcycle M. This avoids distorting the sound coming from speakers 14. In this regard, Wiseman is going the wrong direction. Wind and vibration will create much more distortion than the present invention. First speaker 14 can be mechanically coupled to first speaker plate 20. Likewise, second speaker 14 can be mechanically coupled to second speaker plate 20.

Figure 5:
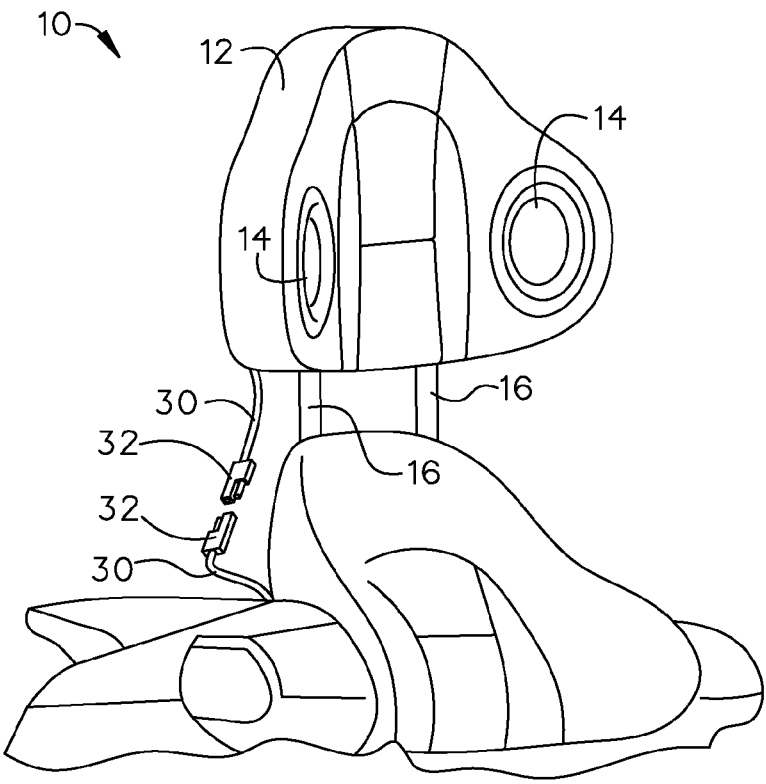
FIG. 5 is a perspective detail view of an embodiment of the invention demonstrating plug and play feature (pre connection).
Figure 6:
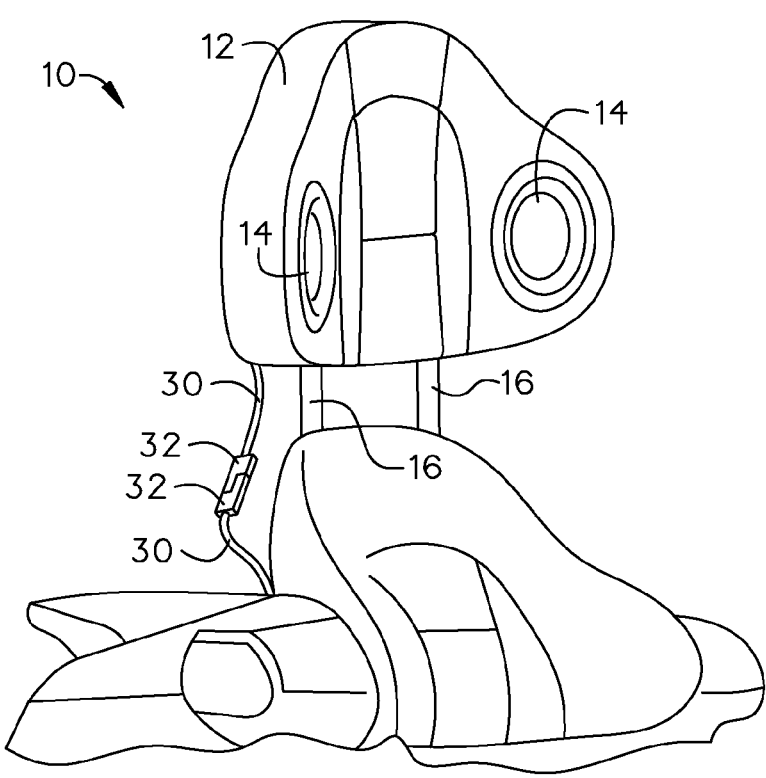
FIG. 6 is a perspective detail view of an embodiment of the invention demonstrating plug and play feature (post connection).

As shown in FIG. 5 and FIG. 6, speakers 14 are electrically coupled to speaker wire 30. Speaker wire 30 terminates at speaker connector 32. Motorcycle M is electrically coupled to motorcycle wire 30. Motorcycle wire 30 terminates at motorcycle connector 32. Connecting speaker connector 32 with motorcycle connector 32 allows the sound system of motorcycle M to connect with speakers 14.

Persons of ordinary skill in the art may appreciate that numerous design configurations may be possible to enjoy the functional benefits of the inventive systems. Thus, given the wide variety of configurations and arrangements of embodiments of the present invention the scope of an embodiment of the invention is reflected by the breadth of the claims below rather than narrowed by the embodiments described above.

What is claimed is:

1. A speaker assembly for a motorcycle, configured to provide sound to a passenger in the motorcycle; the speaker assembly comprising:
    a first support attachment attached to the motorcycle and parallel to a second support attachment, attached to the motorcycle;
    a support frame, attached to the first support attachment and a second support attachment at distal points from the motorcycle; wherein the support frame has a lower portion connected and perpendicular to both the first support attachment and the second support attachment;
    a central support directly attached and perpendicular to the first support attachment and the second support attachment; wherein portions of the central support are parallel to the lower portion;
    a first speaker and a second speaker mechanically coupled to the central support and electrically coupled to the motorcycle; and
    padding, covering the central support and fitting around the first speaker and the second speaker;
    wherein the first speaker and the second speaker are configured to render the sound to the passenger sitting proximate the padding.

2. The speaker assembly of claim 1, wherein the central support assembly further comprises:
    a first speaker plate and a second speaker plate mechanically coupled to the support frame.

3. The speaker assembly of claim 2, wherein the support frame is generally hemispherical, with an upper left hand truncation and an upper right hand truncation to encourage aerodynamic efficiency.

4. The speaker assembly of claim 3, wherein the support frame is bent in a slightly concave manner so that the first speaker, the second speaker, and thus the sound, are directed inward toward the central support.

5. The speaker assembly of claim 4, wherein the central support is bent to accommodate a natural curvature of a base of a human neck.

6. The speaker assembly of claim 5, further comprising:
    a speaker wire, electrically coupled to the first speaker and the second speaker, and configured to terminate at a speaker connector; and
    a motorcycle wire, electrically coupled to the motorcycle, and configured to terminate at a motorcycle connector;
    wherein connecting the speaker connector with the motorcycle connector enables a sound system of the motorcycle to connect with the first speaker and the second speaker.

* * * * *